(12) United States Patent
Tsai et al.

(10) Patent No.: US 9,642,490 B2
(45) Date of Patent: May 9, 2017

(54) FOOD DEFROSTING TRAY

(71) Applicant: Sekond Creative Design Co., Ltd., Tainan (TW)

(72) Inventors: Yuan-Song Tsai, Tainan (TW); Sheng-Chi Lin, Tainan (TW)

(73) Assignee: Sekond Creative Desgin Co., Ltd., Tainan (TW)

( * ) Notice: Subject to any disclaimer, the term of this patent is extended or adjusted under 35 U.S.C. 154(b) by 413 days.

(21) Appl. No.: 14/219,065

(22) Filed: Mar. 19, 2014

(65) Prior Publication Data
US 2014/0290502 A1    Oct. 2, 2014

(30) Foreign Application Priority Data

Apr. 1, 2013  (TW) .............................. 102205970 U

(51) Int. Cl.
| | |
|---|---|
| A23L 3/36 | (2006.01) |
| A47J 36/24 | (2006.01) |
| A23B 4/07 | (2006.01) |
| A23B 4/06 | (2006.01) |
| A23L 3/365 | (2006.01) |
| A47J 43/24 | (2006.01) |
| B25H 3/00 | (2006.01) |

(52) U.S. Cl.
CPC ............ *A47J 36/2494* (2013.01); *A23L 3/36* (2013.01); *A23B 4/06* (2013.01); *A23B 4/07* (2013.01); *A23L 3/365* (2013.01); *A47J 43/24* (2013.01); *B25H 3/00* (2013.01)

(58) Field of Classification Search
CPC ... A47J 43/24; A23B 4/06; A23B 4/07; A23L 3/36; A23L 3/365; B25H 3/00
USPC .... 99/447, 483, 426; 428/33, 49, 53–4, 167; 126/299 C; 269/289 R, 134, 136
See application file for complete search history.

(56) References Cited

U.S. PATENT DOCUMENTS 2,744,519 A * 5/1956 Means ................... A47J 37/101
126/299 C
3,366,265 A * 1/1968 Hesselbarth ....... B65D 21/0204
220/23.4
(Continued)

FOREIGN PATENT DOCUMENTS

JP        2001231526 A  *  8/2001

OTHER PUBLICATIONS

Sultan Lillaker, Manual of slatted bed, 2008-2015.*

*Primary Examiner* — Ghassem Alie
*Assistant Examiner* — Nhat Chieu Do
(74) *Attorney, Agent, or Firm* — Alan D. Kamrath; Kamrath IP Lawfirm, P.A.

(57) ABSTRACT

A food defrosting tray includes a tray body on which a frozen food is adapted to be placed. The tray body is made of metal and includes a plurality of heat transfer pieces spaced in parallel. The food defrosting tray further includes two conjunction members which engage with first and second ends of the heat transfer pieces respectively. Each conjunction member includes a plurality of sheaths made of a pliable but strong material. Two adjacent sheaths are connected to each other through a collapsible portion so that the tray body and the conjunction members are collapsible and can be rolled up for better contact with a food material and preferable defrosting capability. Moreover, the foldable tray body allows the food defrosting tray to be rolled up easily for effective storage.

4 Claims, 9 Drawing Sheets

(56) References Cited

U.S. PATENT DOCUMENTS

| | | | | |
|---|---|---|---|---|
| 4,392,389 A * | 7/1983 | Eckstein | ............ | B01L 3/50825 |
| | | | | 206/443 |
| 4,877,672 A * | 10/1989 | Shreiner | ................ | A47L 23/26 |
| | | | | 428/156 |
| 5,157,804 A * | 10/1992 | Williams | ................ | A47L 23/26 |
| | | | | 15/161 |
| 5,190,799 A * | 3/1993 | Ellingson, III | ......... | E04F 15/10 |
| | | | | 15/215 |
| 5,848,637 A * | 12/1998 | Lee | ......................... | A23L 3/365 |
| | | | | 165/104.21 |
| 7,846,524 B2 * | 12/2010 | Baglietto | ........... | A47G 27/0218 |
| | | | | 15/215 |
| 2007/0220708 A1 * | 9/2007 | Lewis | ................... | E05D 7/1072 |
| | | | | 16/334 |
| 2010/0012539 A1 * | 1/2010 | Wang | ..................... | B25H 3/003 |
| | | | | 206/379 |
| 2010/0269714 A1 * | 10/2010 | Zhou | ....................... | A23L 3/365 |
| | | | | 99/485 |

\* cited by examiner

FOOD DEFROSTING TRAY

BACKGROUND OF THE INVENTION

The present invention relates to a food defrosting tray and, more particularly, to a food defrosting tray for a frozen food to be defrosted.

Modern people, who are accustomed to western-style diets and urban schedules, gradually prefer bulk purchases of living goods and food materials which can be frozen in refrigerators. In general, frozen foods to be processed should be defrosted in either an ambient air condition or running water, each of which consumes much time and accelerates propagation of germs affecting freshness of food materials.

Furthermore, a metal defrosting board for frozen foods is available in the market for fast defrosting. However, the conventional defrosting board with a large-sized plate body cannot completely or properly match an uneven surface of a bulky food material and, thus, results in the food material defrosted unequally. Additionally, the conventional defrosting board with fixed dimensions cannot be stored easily.

BRIEF SUMMARY OF THE INVENTION

It is an objective of the present invention to provide a food defrosting tray for improving the above mentioned problems. The food defrosting tray of the present invention is adapted to be placed by a frozen food for fast defrosting and matches a profile of a food material for preferable defrosting capability. Furthermore, the food defrosting tray of the present invention is collapsible and can be rolled up for preferable defrosting capability and an effective storage.

To achieve this and other objectives, a food defrosting tray of the present invention includes a tray body and two conjunction members. The tray body is adapted to be placed by a frozen food and includes a plurality of spaced metal heat transfer pieces. Each heat transfer piece includes a first end and a second end spaced from the first end along a longitudinal axis thereof. The two conjunction members are respectively engaged with the first and second ends of the heat transfer pieces for connection of the heat transfer pieces. Each conjunction member includes a plurality of sheaths made of a pliable but strong material. Each of the sheaths includes a conjunct slot formed in a front end thereof and is securely engaged with one of the first and second ends of one of the heat transfer pieces. A collapsible portion is formed between and links two adjacent sheaths, allowing the conjunction members and the tray body to be folded and rolled up for better contact with a food material as well as preferable defrosting capability.

Preferably, each of the conjunction members further includes a first fixed part and a second fixed part which are respectively formed at outer ends of two fringe sheaths. The first fixed part is detachably coupled with the second fixed part. Each heat transfer piece further includes an upper surface on which the frozen food is adapted to be placed, a lower surface opposite to the upper surface, and a plurality of cooling fins spaced at a fixed interval and extending from the lower surface downwardly.

In a preferred form, the collapsible portions and the sheaths of each conjunction member develop to be a one-piece construction, and each collapsible portion is formed between upper portions of two adjacent sheaths.

The present invention will become clearer in light of the following detailed description of illustrative embodiments of this invention described in connection with the drawings.

DETAILED DESCRIPTION OF THE INVENTION

Figure 1:
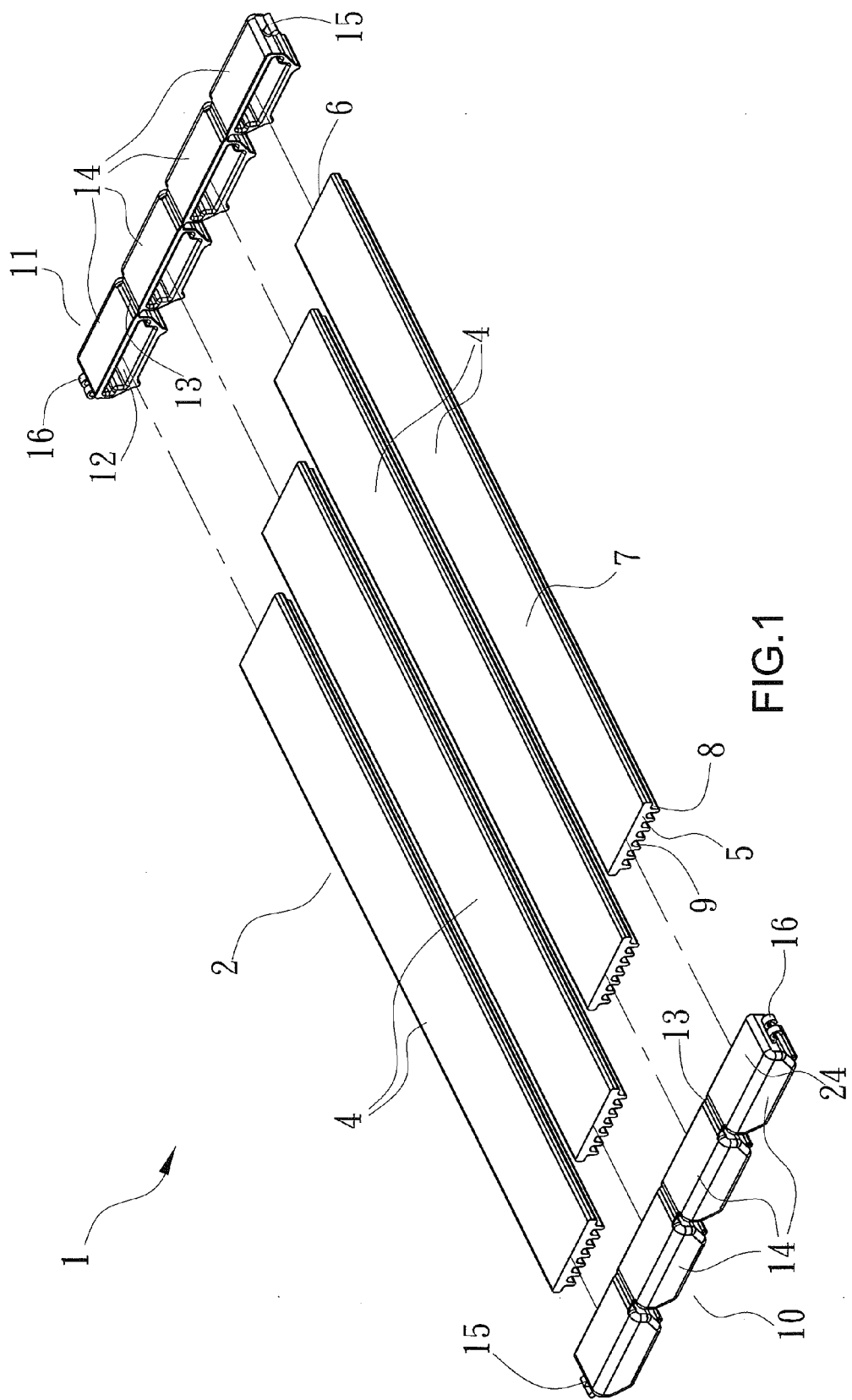
FIG. 1 shows an exploded, perspective view of a food defrosting tray according to a first embodiment of the present invention.

A food defrosting tray 1 according to a first embodiment of the present invention is shown in FIGS. 1 through 5 of the drawings and includes a tray body (thermal conduction unit) 2 and two conjunction members 10, 11. The tray body 2 includes a plurality of heat transfer pieces 4 which are spaced in parallel. Each transfer piece 4 is made of metal with good thermal conductivity (e.g., aluminum, copper, etc.) and includes a first end 5 and a second end 6 spaced from the first end 5 along a longitudinal axis of the transfer piece 4. Each transfer piece 4 further includes an upper surface 7 on which a frozen food is adapted to be placed, a lower surface 8 opposite to the upper surface 7, and a plurality of cooling fins 9 spaced at a fixed interval and extending from the lower surface 8 vertically. Alternatively, the cooling fins 9 extend from the lower surface 8 obliquely or in a staggered way.

Figure 4:
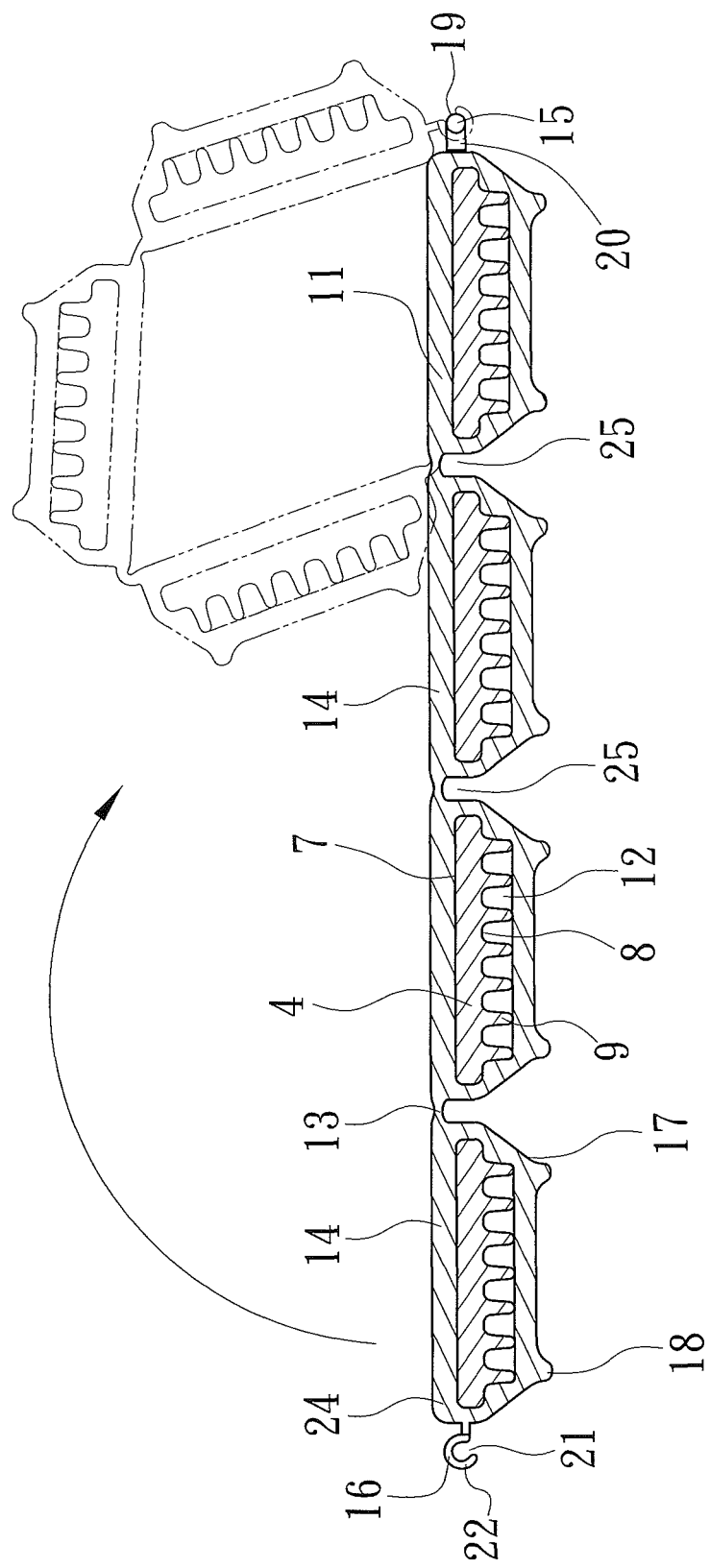
FIG. 4 is a sectional view of the food defrosting tray of FIG. 2 and shows a schematic view of the food defrosting tray which is being rolled up.
Figure 5:
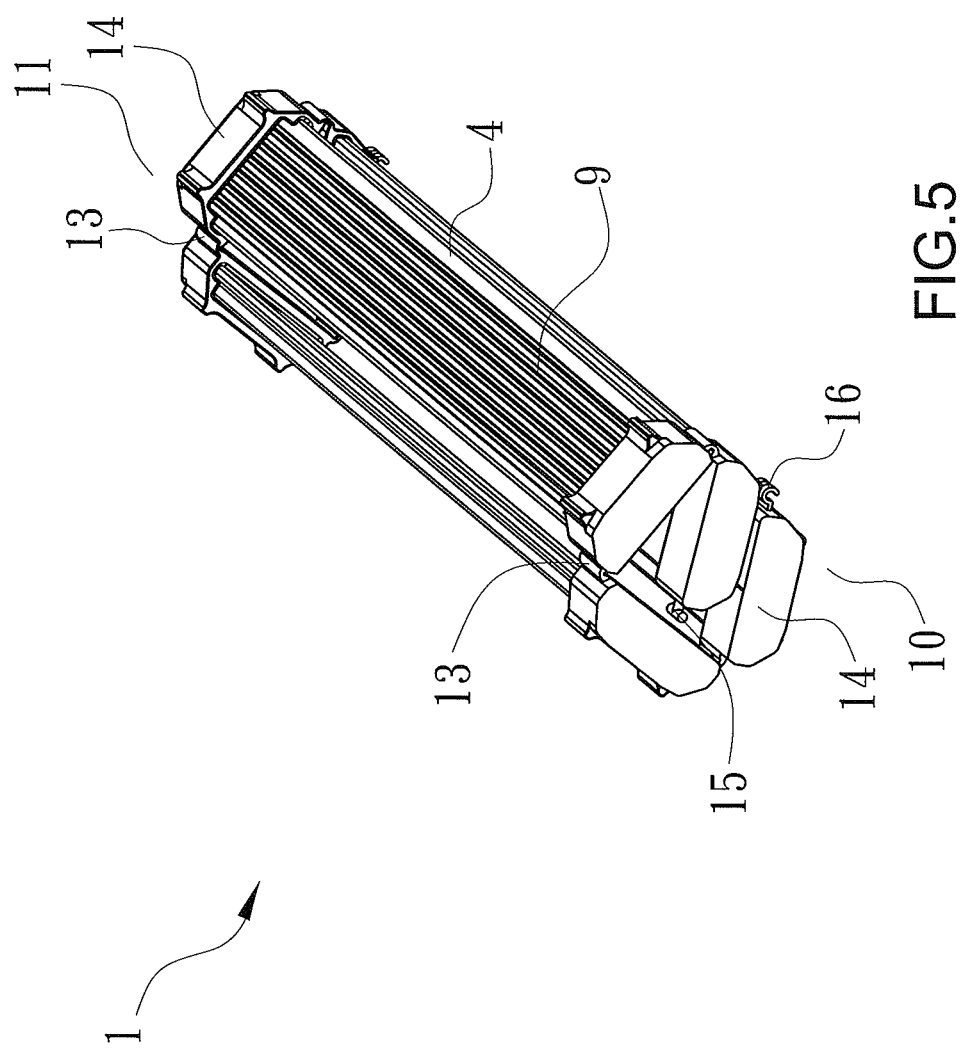
FIG. 5 is a perspective view of the food defrosting tray of FIG. 4 which is rolled up.
Figure 6:
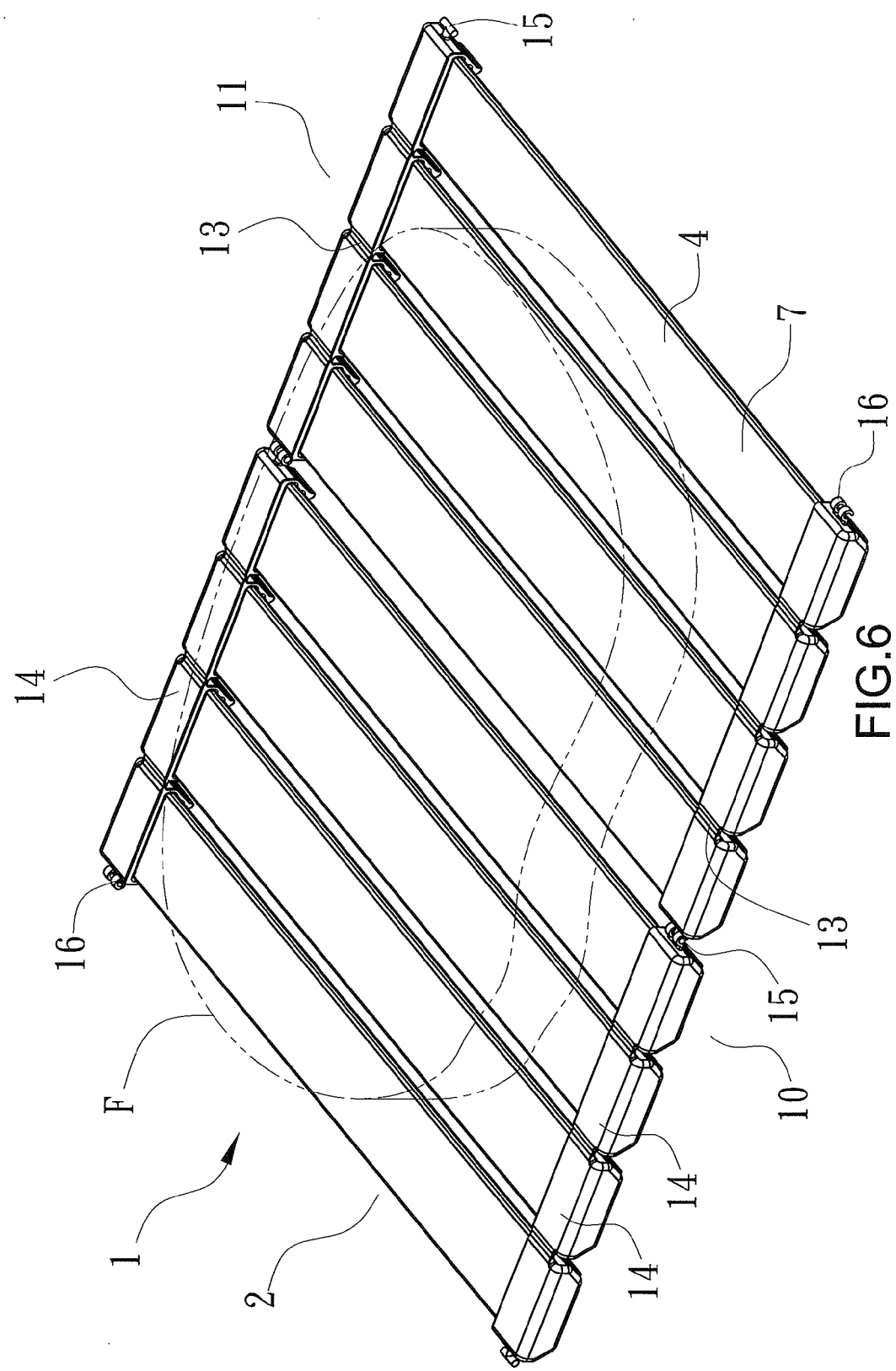
FIG. 6 shows a perspective view of a food defrosting tray according to a second embodiment of the present invention.
Figure 7:
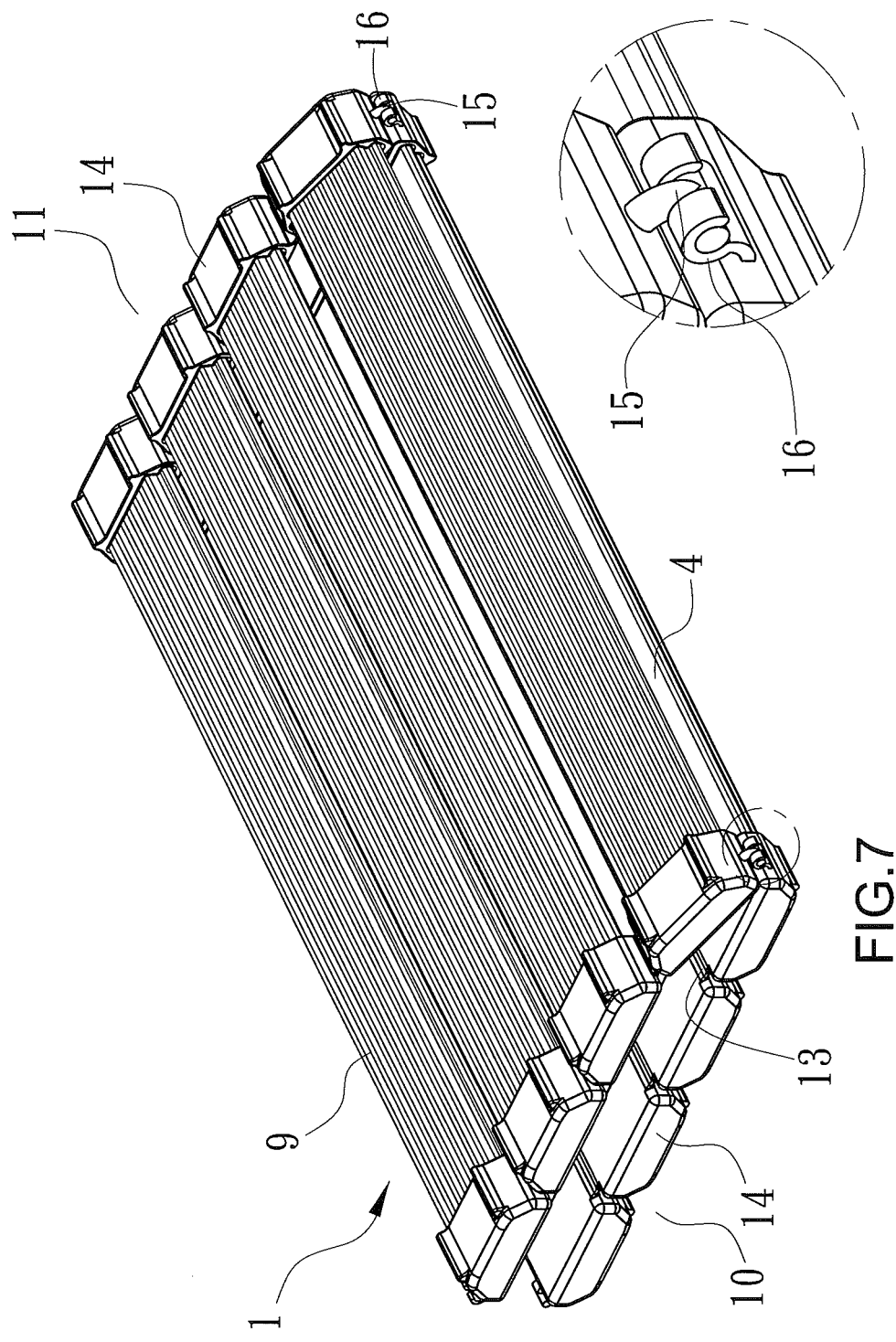
FIG. 7 is a schematic view of the food defrosting tray of FIG. 6 which is folded for use and shows an enlarged view of a circled portion.
Figure 8:
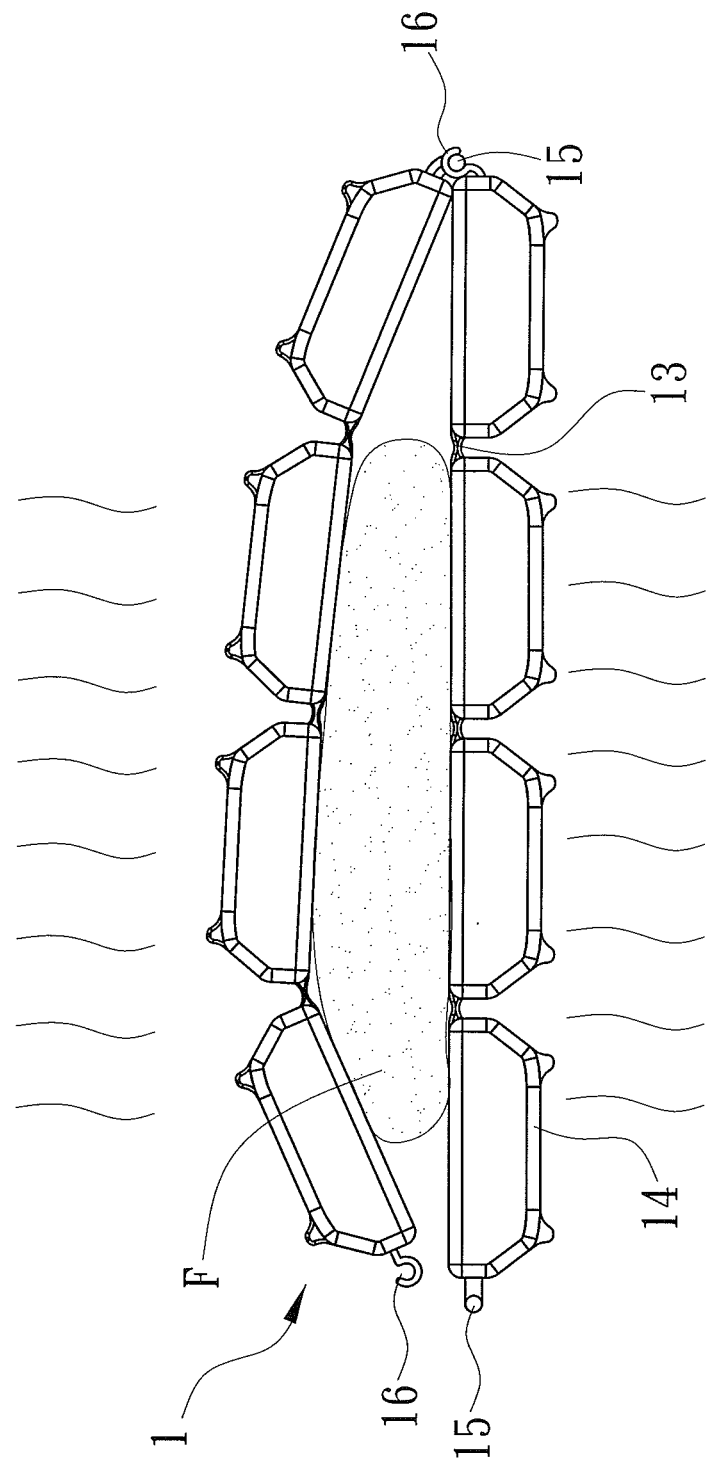
FIG. 8 is a sectional, schematic view of the defrosting tray in FIG. 7.

The conjunction members 10, 11 are made of a pliable but strong material (e.g., silicon, rubber, etc.) and engage with the first and second ends 5 and 6 of the heat transfer pieces 4 respectively, so that the heat transfer pieces 4 are connected to one another, with a spacing 25 defined between two adjacent heat transfer pieces 4 (FIG. 4). Each of the conjunction members 10, 11 includes a plurality of sheaths 14, and each sheath 14 includes a conjunct slot 12 in a front end thereof with a profile less than that of the first and second ends 5 and 6 of the heat transfer piece 4. Due to the elasticity of the pliable but strong material, the conjunct slot 12 can securely engage with the first end 5 or the second end 6. A collapsible portion 13 is formed between and links any two adjacent sheaths 14, allowing the conjunction members 10, 11 and the tray body 2 can be folded and rolled up (see an arrow direction in FIG. 4). In this embodiment, each of the sheaths 14 includes two flanks 17 beveling inwardly and ribs 18 at both sides of a lower surface thereof. The collapsible portions 13 and the sheaths 14 of each of the conjunction member 10, 11 develop to be a one-piece construction, and each collapsible portion 13 is formed between upper portions 24 of two adjacent sheaths 14.

Figure 2:
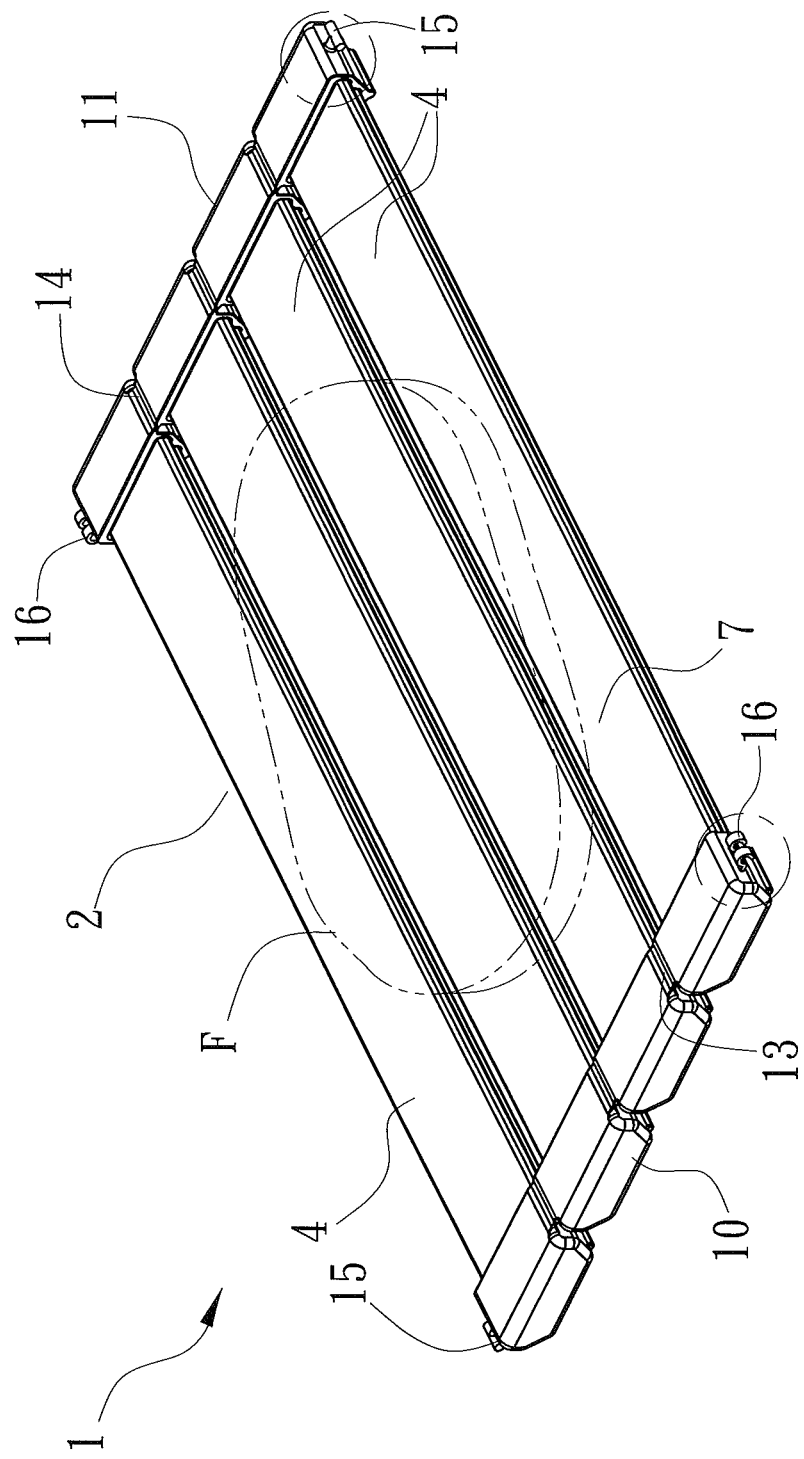
FIG. 2 is a perspective view of the food defrosting tray of FIG. 1.
Figure 3:
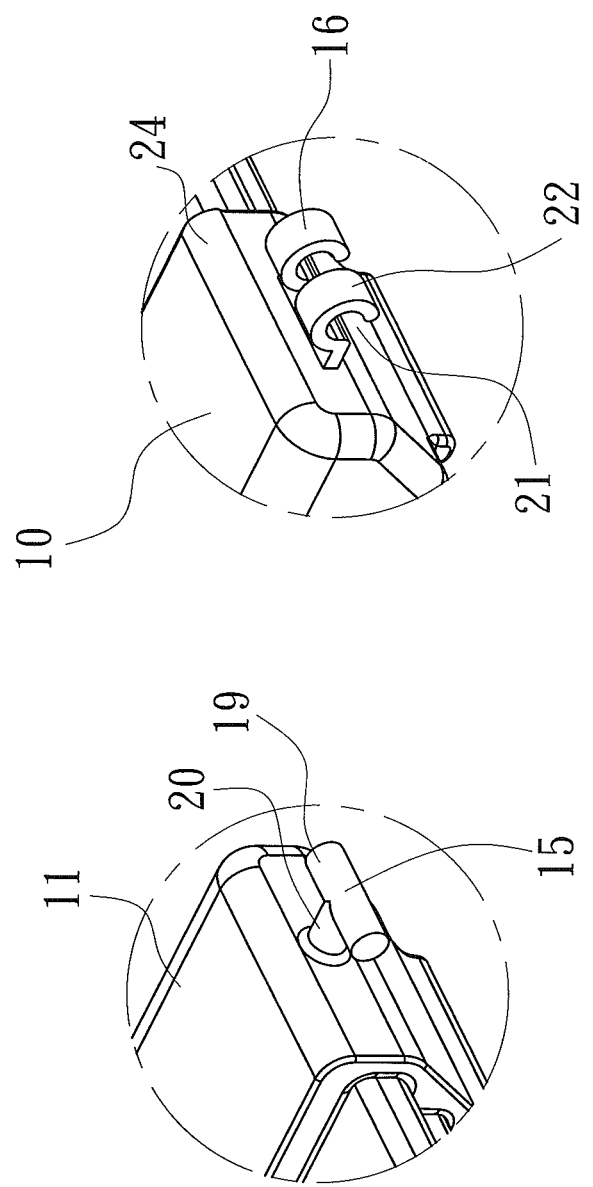
FIG. 3 shows two enlarged views of two circled portions in FIG. 2.

Each of the conjunction members 10, 11 further includes a first fixed part 15 and a second fixed part 16 which are respectively formed at outer ends of the upper portions 24 of two fringe sheaths 14, and the first fixed part 15 is detachably coupled with the second fixed part 16. In this embodiment, the first fixed part 15 is a T-shaped component including a cross-bar portion 19 and a straight-bar portion 20 which integrally extends from the upper portion 24 of an associated sheath 14 and connects to a middle section of the cross-bar portion 19 (see FIG. 3). The second fixed part 16 is a C-shaped component including two annuli or hooks 22 with openings 21, both of which are spaced from each other and collectively extend from the upper portion 24 of an associated sheath 14. The second fixed part 16 depends on the two openings 21 to hook up the cross-bar portion 19 of the first fixed part 15 so that two food defrosting tray 1 in FIG. 2 can be assembled or disassembled. Referring to FIG. 6 through 9, the number or the size of a food defrosting tray 1 of the present invention can be scalable, that is, the area of a food defrosting tray 1 according to the present invention is increased with the size of a food material F, when the first fixed parts 15 and the second fixed parts 16 of two food defrosting tray 1 in FIG. 2 are integrated with each other in the case of the bulky food material F not sustained by a single food defrosting tray 1 in FIG. 2 or not defrosted immediately.

Figure 9:
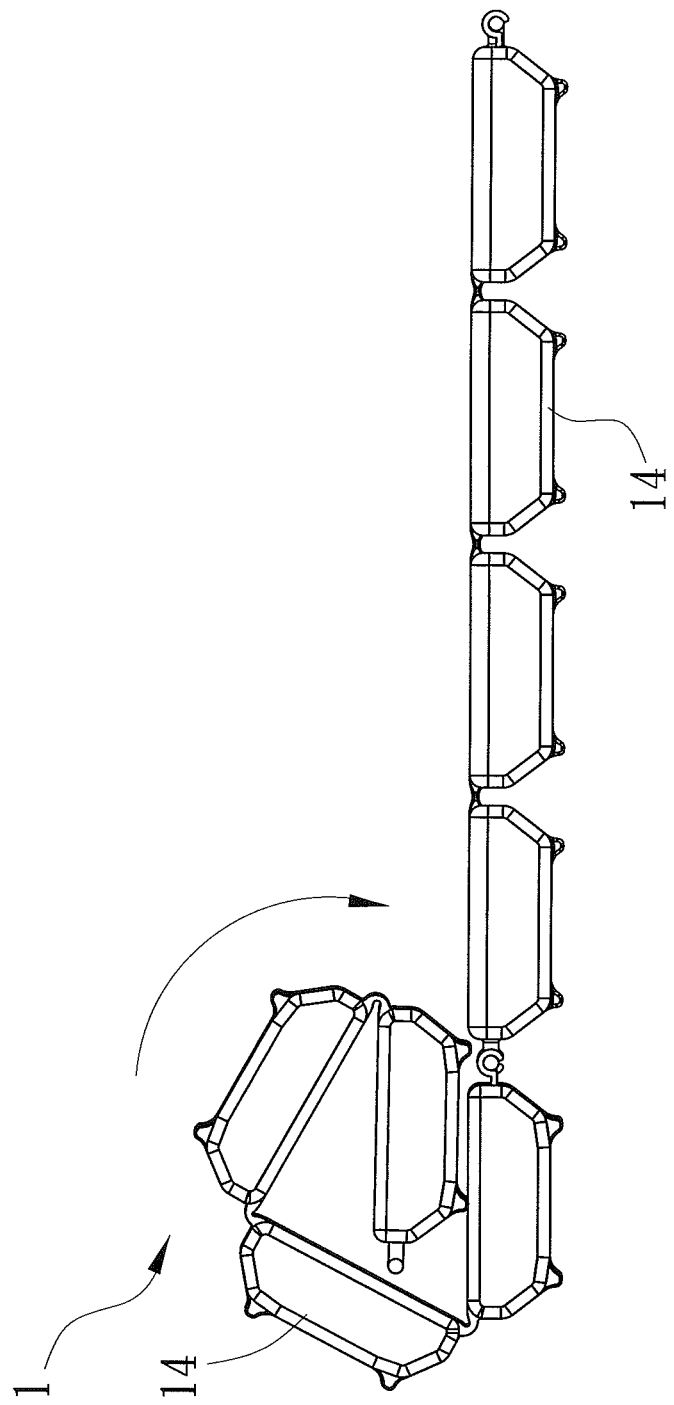
FIG. 9 is a schematic view of the food defrosting tray in FIG. 6 which is rolled up.

In the implementation of the food defrosting tray 1 according to the present invention, the food defrosting tray 1 can be folded in half to allow the food material F to be held inside (FIG. 7 and FIG. 8) for concurrent heat exchange at both sides of the food material F and preferable defrosting capability based on better contact with the food material F. As shown in FIG. 9, the expanded food defrosting tray 1 can be rolled up to shrink its volume and facilitate storage. In addition, the spacing 25 between adjacent heat transfer pieces 4 allows the flow of air to achieve air convection, so that the defrosting function can be enhanced. Furthermore, water droplets incurred from defrosting of the food material F is discharged through the spacing 25 between adjacent heat transfer pieces 4 and is not in contact with the food material F to maintain freshness of the food materials.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

The invention claimed is:

1. A food defrosting tray comprising:
a tray body adapted for placement of a frozen food thereon, the tray body including a plurality of heat transfer pieces formed of metal, each of the plurality of heat transfer pieces including a first end and a second end opposite to the first end along a longitudinal axis, wherein each of the plurality of heat transfer pieces further includes an upper surface on which the frozen food is adapted to be placed, a lower surface opposite to the upper surface, and a plurality of cooling fins are spaced at a fixed interval and extending from the lower surface opposite to the upper surface to lower ends; and
two conjunction members respectively engaging with the first and second ends of each of the plurality of heat transfer pieces, each of the conjunction members including a sheath made of a pliable material different than the metal of the tray body,
wherein the sheath includes a conjunct slot formed in a front end thereof having a shape which corresponds to a shape of one of the first and second ends for slideably receiving the one of the first and second ends and a rear end which is closed,
a collapsible portion formed between and linking two adjacent sheaths, wherein the collapsible portion includes a first fixed part and a second fixed part which are respectively formed at outer ends of the two adjacent sheaths, the first fixed part detachably coupled with the second fixed part,
wherein the first fixed part includes a cross-bar portion and a straight-bar portion extending from one of the outer ends of the two adjacent sheaths and connected to a middle section of the cross-bar portion, the cross-bar portion spaced from and parallel to one of the outer ends of the two adjacent sheaths,
wherein the second fixed part includes two hooks spaced from each other to define a space and collectively extending from one of the outer ends of another of the two adjacent sheaths, each of hooks defining an opening parallel to one of the outer ends of the other of the two adjacent sheaths, wherein the openings of the two hooks have a size for passage of the cross-bar portion, and the straight-bar portion moveably received in the space between the hooks and the cross-bar portion rotatably received in the two hooks.

2. The food defrosting tray according to claim 1, wherein a spacing is defined between two adjacent heat transfer pieces and the conjunct slot abutting with the upper surface and abutting with and extending across the lower ends of the plurality of cooling fins spaced from the lower surface.

3. The food defrosting tray according to claim 2, wherein the first and second fixed parts are respectively formed at the outer ends of the two sheaths to be a one-piece construction, respectively.

4. The food defrosting tray according to claim 1, wherein the straight-bar portion integrally extends from one of the outer ends of the two adjacent sheaths, and the two hooks integrally extend from the outer end of the other of the two adjacent sheaths.

* * * * *